(12) United States Patent
Tuxen

(10) Patent No.: US 11,086,005 B2
(45) Date of Patent: *Aug. 10, 2021

(54) DEVICE, SYSTEM, AND METHOD FOR TRACKING MULTIPLE PROJECTILES

(71) Applicant: TRACKMAN A/S, Vedbaek (DK)

(72) Inventor: Fredrik Tuxen, Horsholm (DK)

(73) Assignee: TRACKMAN A/S, Vedbaek (DK)

( * ) Notice: Subject to any disclaimer, the term of this patent is extended or adjusted under 35 U.S.C. 154(b) by 61 days.

This patent is subject to a terminal disclaimer.

(21) Appl. No.: 16/514,384

(22) Filed: Jul. 17, 2019

(65) Prior Publication Data

US 2019/0361107 A1 Nov. 28, 2019

Related U.S. Application Data

(63) Continuation of application No. 15/206,996, filed on Jul. 11, 2016, now Pat. No. 10,379,214.

(51) Int. Cl.
| | |
|---|---|
| *G01S 13/72* | (2006.01) |
| *G01S 13/87* | (2006.01) |
| *G01S 7/06* | (2006.01) |
| *G01S 13/06* | (2006.01) |
| *G01S 13/58* | (2006.01) |
| *G01S 13/88* | (2006.01) |

(52) U.S. Cl.
CPC .............. *G01S 13/726* (2013.01); *G01S 7/06* (2013.01); *G01S 13/06* (2013.01); *G01S 13/58* (2013.01); *G01S 13/876* (2013.01); *G01S 13/878* (2013.01); *G01S 13/88* (2013.01)

(58) Field of Classification Search
CPC ........ G01S 13/06; G01S 13/58; G01S 13/726; G01S 13/876; G01S 13/878; G01S 13/88; G01S 7/06
See application file for complete search history.

(56) References Cited

U.S. PATENT DOCUMENTS

| | | | |
|---|---|---|---|
| 6,057,915 A * | 5/2000 | Squire | G01S 7/48 356/139.05 |
| 6,122,960 A | 9/2000 | Hutchings et al. | |
| 2002/0107078 A1* | 8/2002 | Collins | A63B 43/008 473/152 |
| 2008/0139330 A1* | 6/2008 | Tuxen | A63B 69/3658 473/199 |
| 2016/0074704 A1* | 3/2016 | Vollbrecht | A63B 69/36 473/199 |
| 2018/0011184 A1* | 1/2018 | Du Toit | G01S 13/34 |

FOREIGN PATENT DOCUMENTS

| | | |
|---|---|---|
| JP | 2007101294 | 4/2007 |
| JP | 4773176 | 9/2011 |

* cited by examiner

*Primary Examiner* — Timothy X Pham
(74) *Attorney, Agent, or Firm* — Fay Kaplun & Marcin, LLP

(57) ABSTRACT

A system for tracking multiple projectiles includes a first radar device aimed so that a field of view of the first radar device covers at least a portion of a target area into which projectiles are to be launched from a plurality of launch locations and a processor receiving data from the radar and identifying from the data tracks of a plurality of projectiles. The processor determines for each projectile track identified a specific one of the launch locations from which the projectile was launched and provides to the launch location associated with each projectile data corresponding to a trajectory of the projectile.

18 Claims, 14 Drawing Sheets

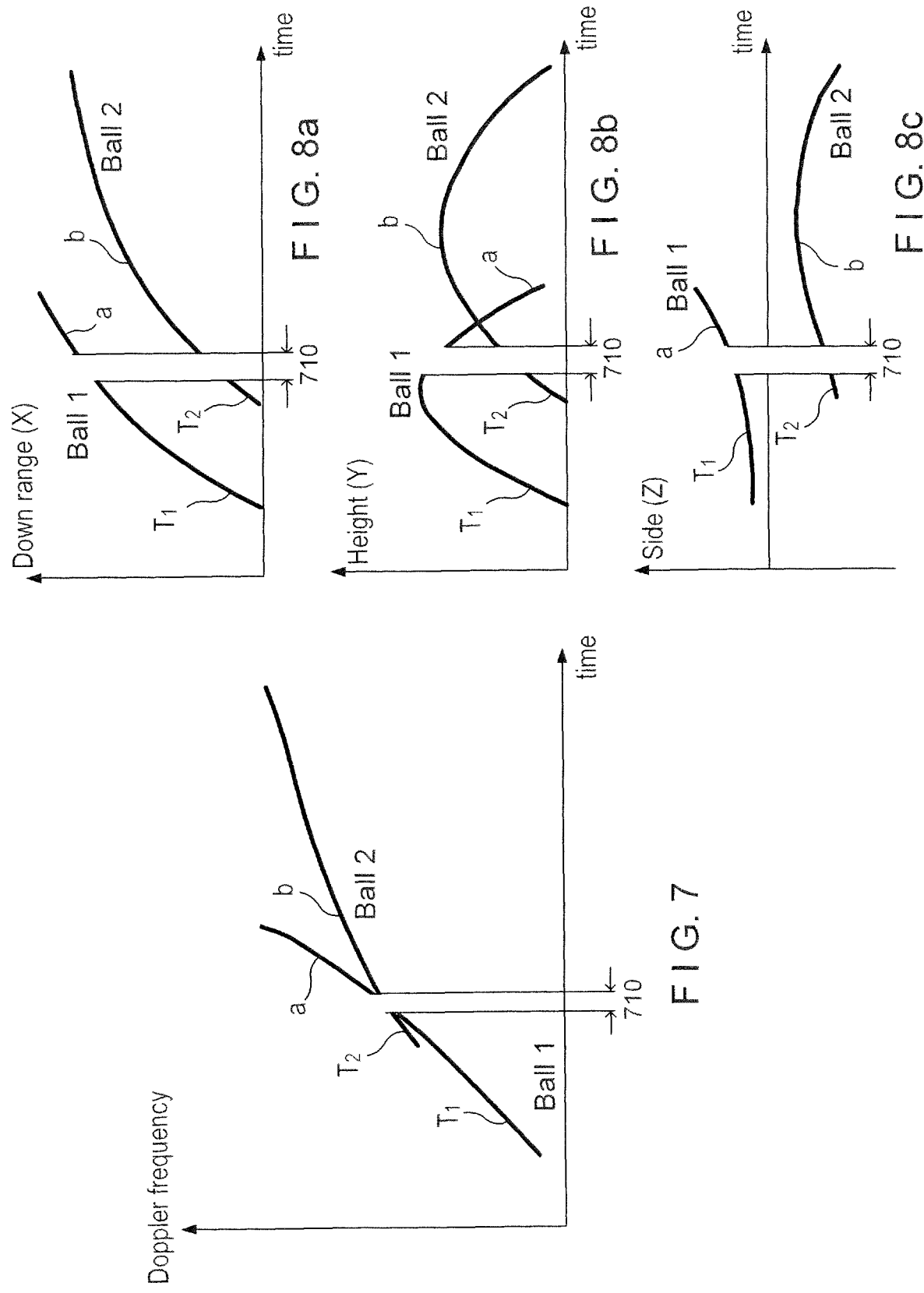

DEVICE, SYSTEM, AND METHOD FOR TRACKING MULTIPLE PROJECTILES

PRIORITY INFORMATION

The present a disclosure claims priority to U.S. patent application Ser. No. 15/206,996 filed Jul. 11, 2016; the disclosure of which is incorporated herewith by reference.

BACKGROUND INFORMATION

Systems are known for tracking the flight of a single projectile such as a golf ball. However, tracking becomes significantly more difficult in situations where multiple projectiles are being launched from multiple launch areas into a common target area. Although it would be possible to provide a dedicated tracking system for each launching area, depending on the number of launch areas, the cost of such an arrangement may be prohibitive. In addition, where many projectiles are being launched at unpredictable intervals, trajectories of projectiles may intersect (or nearly intersect) requiring the system to distinguish between these trajectories to ensure that portions of the trajectories after the intersection are associated with the proper initial trajectory (before intersection) to ensure that the full trajectory for each projectile is accurately determined.

SUMMARY OF THE INVENTION

The present invention relates to a system for tracking multiple projectiles comprising a first radar device aimed so that a field of view of the first radar device covers at least a portion of a target area into which projectiles are to be launched from a plurality of launch locations and a processor receiving data from the radar and identifying from the data tracks of a plurality of projectiles, the processor determining for each projectile track identified a specific one of the launch locations from which the projectile was launched and providing to the launch location associated with each projectile data corresponding to a trajectory of the projectile.

According to an exemplary embodiment, the system of further includes a second radar device aimed so that a second field of view of the second radar device covers at least a portion of the target volume including a portion of the target volume outside the first field of view as well as an overlap portion of the target volume also included in the first field of view.

According to an exemplary embodiment, the device associated with each location includes a screen displaying the data.

According to an exemplary embodiment, for each of a plurality of time frames, the processor receives from the first radar device a radar signal and calculates from this radar signal projectile data including position and speed values for each projectile identified.

According to an exemplary embodiment, for each time frame, the processor refers to data from at least one prior time frame and determines for each projectile identified, whether the projectile data correlates with an existing trajectory and, when the projectile data correlates with an existing trajectory, the processor updates the existing trajectory with which the current projectile data correlates to include the current projectile data.

According to an exemplary embodiment, when the current projectile data for an identified projectile does not correlate with an existing trajectory, initiating a new trajectory.

According to an exemplary embodiment, for each trajectory the processor compares an initial projectile position to known launch locations and, if the initial projectile position matches a known launch location, the processor assigns this launch location to the trajectory.

According to an exemplary embodiment, when the initial projectile position for a trajectory does not match a known launch location, the processor, based on the trajectory, extrapolates backward in time from the initial projectile position to a launch location for the projectile.

According to an exemplary embodiment, the multiple projectiles are golf balls being launched in a driving range and wherein the processor compares launch locations to known locations of a plurality of hitting bays from which golf balls are hit into the driving range, with each hitting bay being identified by the processor as a single launch location so that any golf balls launched from any location within a hitting bay are identified as originating from that hitting bay and provides to a device associated with the hitting bay the data corresponding to a trajectory of the projectile.

According to an exemplary embodiment, the system further includes a third radar device aimed so that a third field of view of the second radar device covers at least a portion of the target volume including a portion of the target volume outside the first and second fields of view as well as an overlap portion of the target volume also included in one of the first and second fields of view.

According to an exemplary embodiment, the first radar device is positioned at a first end of the target volume at which the launch locations are located with the first field of view extending into the target volume from the launch locations toward a far end of the target volume, the second radar device is positioned on a first lateral side of the target volume facing the first end of the target volume and including a first portion of launch locations including a first location adjacent to the first lateral side, the third radar device is positioned on a second lateral side of the target volume facing the first end of the target volume and including a second portion of launch locations including a second location adjacent to the first lateral side.

According to an exemplary embodiment, the second and third fields of view overlap so that the entire first end of the target volume is within at least one of the second and third fields of view.

According to an exemplary embodiment, the processor receives position data from a device associated with a user and identifies a location of the device as a known launch location.

According to an exemplary embodiment, the position data received by the processor is GPS data from a mobile device.

According to an exemplary embodiment, the processor identifies as known launch locations for each of a plurality of devices logged in as users of the system.

According to an exemplary embodiment, when the processor identifies a projectile as potentially associated with a known launch location, the processor sends to the device associated with the known launch location trajectory information for the projectile and a request to the user of the device to confirm that the projectile is associated with the known launch location.

According to an exemplary embodiment, the first radar device is a continuous wave Doppler radar.

BRIEF DESCRIPTION OF THE DRAWINGS

FIG. 7 shows a graph (Doppler frequency v. Time) of signals detected by a radar including two Tracks T1 and T2 that intersect;

FIGS. 8a, 8b, and 8c show graphs of data corresponding to the signals of FIG. 7 broken down as representations of components of the movement of two balls in three-dimensional space.

DETAILED DESCRIPTION

Figure 1:
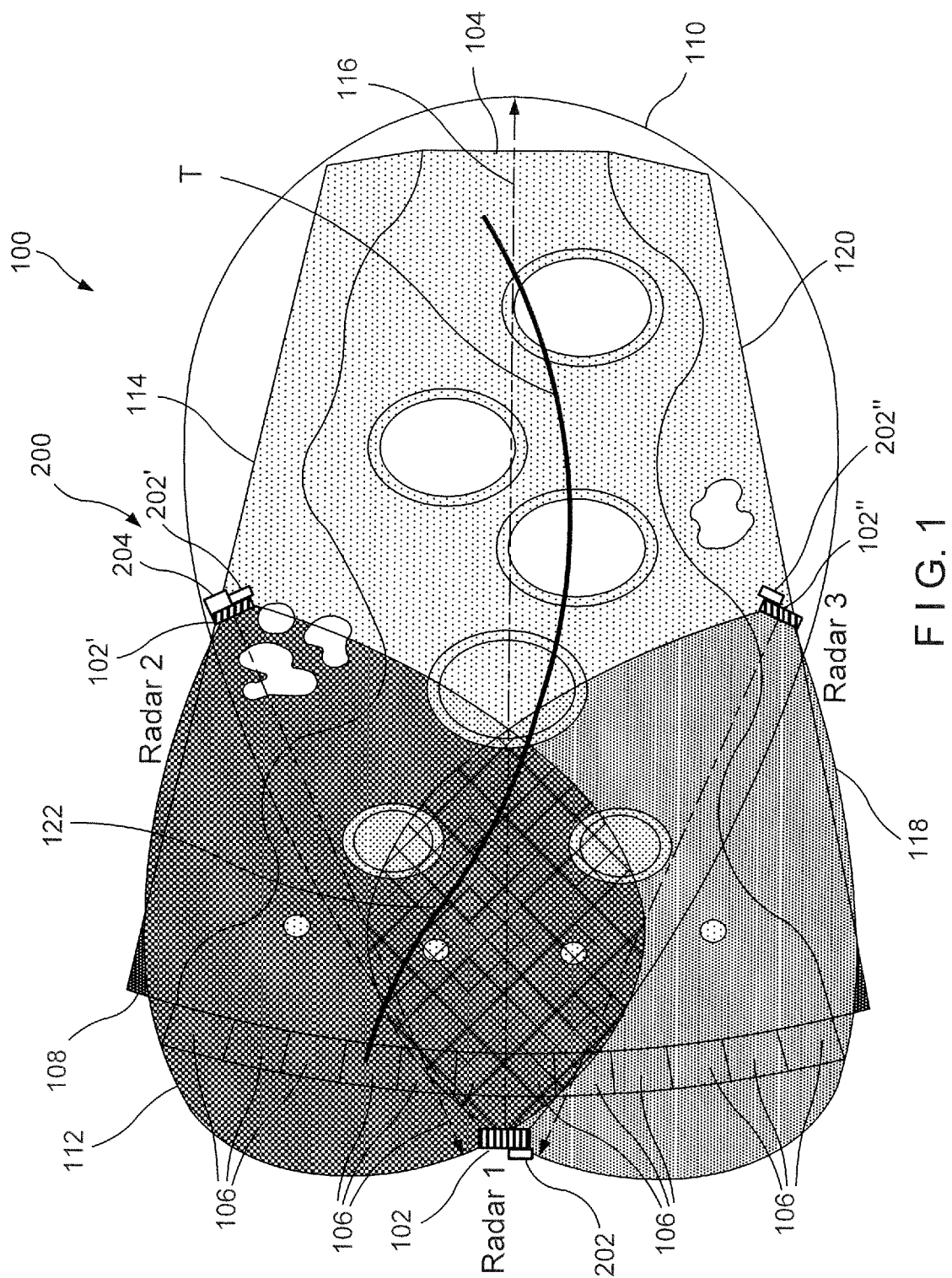
FIG. 1 shows a perspective view of a golf driving range with a radar tracking system according to a first exemplary embodiment.

The exemplary embodiments may be further understood with reference to the following description and the related appended drawings, wherein like elements are provided with the same reference numerals. The exemplary embodiments relate to a device, a system, and a method using radar to track multiple projectiles being launched from multiple launching locations as the projectiles move through an area and identifying the launching location from which each projectile was launched. Depending on the physical size on the launch areas as well as practical issues like line-of-sight blockage for a first radar device, it may be desirable to have one or more additional radar devices in the system to increase the coverage of the volume being covered by the system. It is preferable to cover the entire range of launch areas, so that the launched projectiles can be acquired shortly after launch by the system, to enable association of projectile trajectories and related data to individual launch locations. Although exemplary embodiments detailed herein describe the tracking of golf balls, those skilled in the art will understand that any sports balls or even non-sports related projectiles may be tracked with the system in the same manner.

FIG. 1 shows a first system 100 for tracking an object according to the exemplary embodiments. The first system 100 includes three radar devices 102, 102', 102" distributed around a target area into which projectiles are to be launched. In the embodiment of FIG. 1, the system 100 is a system for tracking golf balls hit into the target area (driving range 104) from a plurality of launch locations (hitting bays 106) distributed along a first end 108 of the driving range 104. Each radar unit may, for example, be a continuous wave Doppler radar emitting microwaves at X-band (10.5-10.6 GHz) emitting approximately 500 milliWatts EIRP (Equivalent Isotropic Radiated Power), thus being suitable for complying with FCC and CE regulations for short range intentional radiators. Any type of continuous wave (CW) Doppler radar may be used, including phase or frequency modulated CW radar, multi frequency CW radar or a single frequency CW radar. Current pulsed radar systems are limited in their ability to track objects that are close to the radar device. However, the distance an object must be from these pulsed radar systems has decreased over time and is expected to continue to decrease. Thus these types of radar may soon be effective for these operations and their use in the systems of the invention described below is also contemplated. Throughout the application the tracking of objects is described based on the use of Doppler frequency spectrums. As would be understood, these Doppler frequency spectrums refer to the data from continuous wave Doppler radar. If a pulsed radar system were employed similar data would be calculated based on a time required for the pulse to return to the radar after reflecting off an object. Any other type of radar capable of three-dimensionally tracking objects similar to those described herein may also be used.

Figure 2:
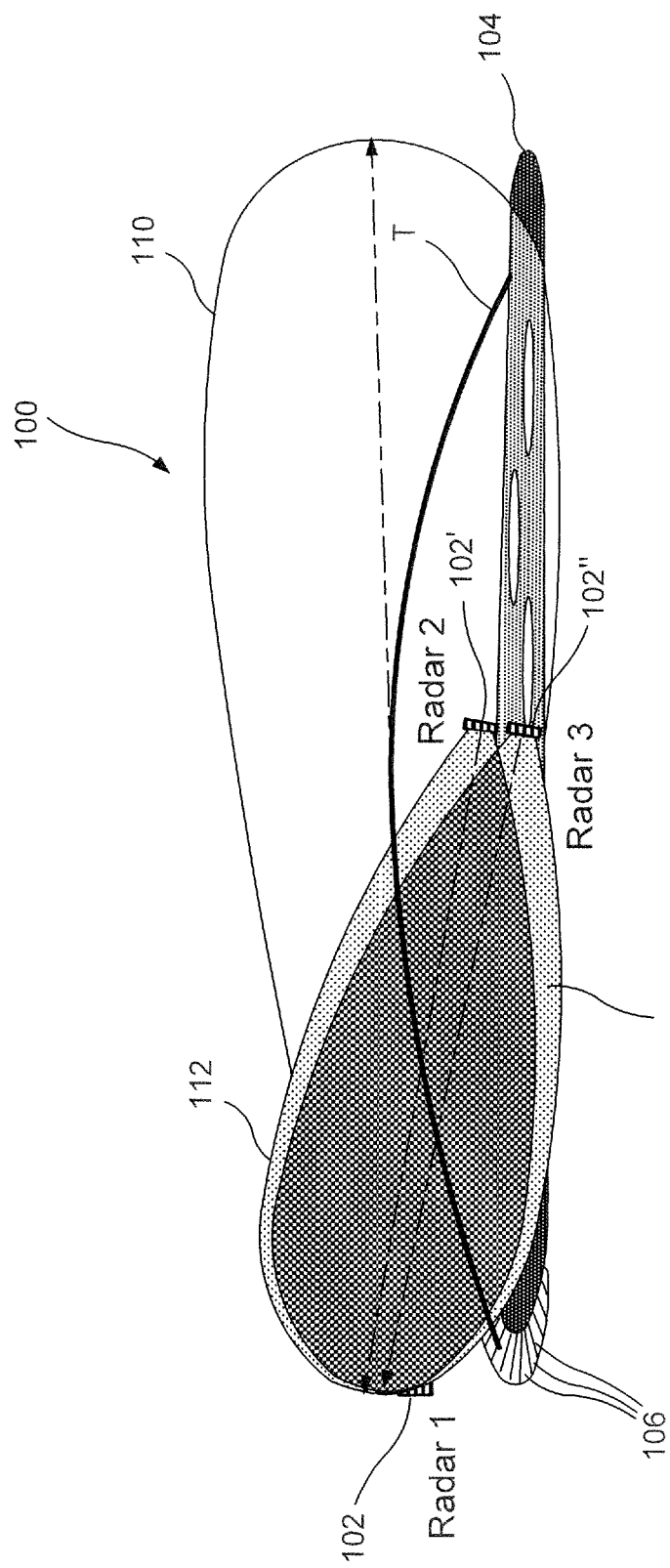
FIG. 2 shows a side view of the golf driving range of FIG. 1.

As seen in FIGS. 1 and 2, the first radar device 102 is positioned behind the hitting bays 106 facing the target area 108. The radar device 102 is positioned such that most of the projectile trajectories launched from the hitting bays 106 will be inside the field of view 110 (beam coverage) of the device 102 without any blockage from buildings and other structures. For a multi floor facility with hitting bays 106 on different levels this means that the radar device 102 is typically positioned either a) centered on façade of the hitting bays between the hitting bay floors, or, alternatively, b) on the roof of the hitting bays. Depending on the number of hitting bays horizontally and the field of view 110, it might be preferred to position the radar device 102 in alternative b) approximately 0-25 m behind the front of the hitting bays 106 and approximately 3 m above the highest hitting bay floor. In this exemplary embodiment, the field of view 110 of the radar 102 extends outward from the hitting bays 106 and encompasses the radar devices 102' and 102" therein as well as the entire portion of the driving range 104 that extends beyond the radar devices 102', 102" (the portion of 104 further from the hitting bays than the radar units 102', 102"). The radar device 102' is on the right hand side of the driving range 104 (when looking toward the hitting bays 106) aimed inward toward the radar device 102 so that a field of view 112 of the radar device 102' includes a first portion of the hitting bays 106 (including all of the hitting bays 106 to the right of the radar device 102 as well as a portion of the driving range 104 in front of the radar device 102' extending from the right hand limit 114 of the driving range 104 to extend across a centerline 116 of the driving range 104. In this exemplary embodiment, the radar devices 102' and 102" are positioned at the right and left hand limits 114, 120, respectively, approximately 75 meters from the hitting bays 106. However, those skilled in the art will understand that any other positions for the radar devices 102, 102', 102" may be selected so long as the fields of view 110, 112, 118 cover the entirety of the target area to avoid blind spots in which trajectory data would not be available.

Similarly, the radar device 102" is on the left hand side of the driving range 104 aimed inward toward the radar device 102 so that a field of view 118 of the radar device 102" includes a second portion of the hitting bays 106 (including all of the hitting bays 106 to the left of the radar device 102 as well as a portion of the driving range 104 in front of the radar device 102" extending from the left hand limit 120 of the driving range 104 to extend across a centerline 116 of the driving range 104. As would be understood by those skilled in the art, the fields of view 112 and 118 overlap in an area 122 including a central one of the hitting bays 106 to ensure that all of the hitting bays 106 are within a field of view 112, 118 of one of the radars 102', 102". In addition, this arrangement ensures that the entire area of the driving range 104 is within one of the fields of view 110, 112, 118 so that each projectile can be tracked throughout its entire trajectory (limited to portions of trajectories that are within the driving range 104).

As would be understood by those skilled in the art, a projectile may move through different areas during its flight such as a first area solely within only one of the fields of view 110, 112, 118 to an area covered by more than one field of view 110, 112, 118 (e.g., overlap area 122) and then into an area within only a different one of the fields of view 110, 112, 118. As the projectile moves from one field of view to another, the system 100 must continuously associate tracking data for an initial part of the trajectory from a first one of the radar devices 102, 102', 102" associated the corresponding field of view 110, 112, 118 with tracking data corresponding to a later part of the trajectory from a second one of the radar devices 102, 102', 102" corresponding to the field of view 110, 112, 118 which the projectile has entered. For example, a golf ball launched from the fourth hitting bay 106 from the right hand limit 114 along trajectory line T toward the centerline 116 first enters the field of view 112 of the radar device 102'. The ball will then pass into the overlap area 122 and from there enters a portion of the driving range 104 that is solely within the field of view 110 of the radar device 102. For an initial part of the trajectory, the system 100 will have data corresponding to the trajectory only from the radar device 102'. For a second part of the trajectory, the system 100 will have data corresponding to this trajectory from radar devices 102, 102' and 102". Thereafter, the ball may pass through an area in which fields of view 110 and 118 overlap before entering the area solely within the field of view 110. The method by which the system 100 correlates the trajectory data from the various radar devices 102, 102', 102" to generate a complete trajectory (e.g., from launch to landing) will be described in more detail below.

The system 100 includes data processing system 200 which, as would be understood by those skilled in the art, may include one or more computers coupled to the radar devices 102, 102' and 102" either via a wired or wireless connection. In one embodiment, the data processing system 200 includes separate computers 202, 202' and 202", each of which is associated with a corresponding one of the radar devices 102, 102', 102" as well as a central computer 204 that coordinates data from the three computers 202, 202', 202". However, those skilled in the art will understand that all of the operations described below can be performed by a single computer or on any number of computers with the various tasks distributed among the computers in any desired fashion.

In one exemplary embodiment, each of the computers 202, 202' and 202" defines its own three-dimensional radar coordinate system relating to data from its corresponding radar device. The central computer 204 then defines a universal coordinate system into which the central computer 204 translates the tracking data formatted in the respective radar coordinate systems as this data is from each of the computers 202, 202', 202". This permits the central computer 204 to track all objects moving through the space in the fields of view 110, 112 and 118 and to plot the trajectories of these objects relative to the driving range 104. Those skilled in the art will understand that the universal coordinate system may be made identical to one of the radar coordinate systems to simplify calculation. However, it may be desirable to define the universal coordinate system based on permanent physical features present in one of the fields of view 110, 112, 118 so that the system 100 may be recalibrated with reference to these permanent physical features. For example, the universal coordinate system may be based on a horizontal first axis extending from a center of a central one of the hitting bays 106 to a center of an endline of the driving range 104, a second horizontal axis perpendicular to the first axis and a third axis extending vertically through an intersection of the first and second axes.

The central computer 204 will also follow the trajectory of each object backward to identify the hitting bay 106 from which each object was launched. Thus, in the case of the driving range 104, each shot can be linked to its hitting bay 106 and the individual golfers may be provided with data on their shots (e.g., via a screen at each hitting bay 106) even when balls are being launched from multiple hitting bays 106 at nearly the same time. In addition, the central computer 204 provides to each of the computers 202, 202', 202" all data regarding all of the objects being tracked so that each of the radars devices 102, 102', 102" can search for objects entering its respective field of view 110, 112, 118, respectively, at known locations (i.e., locations at which current trajectories will enter one of the fields of view 110, 112, 118). Each of the computers 202, 202' and 202" may then translate this data from the central computer 204 into its own radar specific coordinate system so that each object can be continuously tracked even as these objects pass through the different fields of view 110, 112, 118. Those skilled in the art will understand that, alternatively, the central computer 204 may perform the translation and provide the data to each of the computers 202, 202', 202" in its respective coordinate system.

Figure 3A:
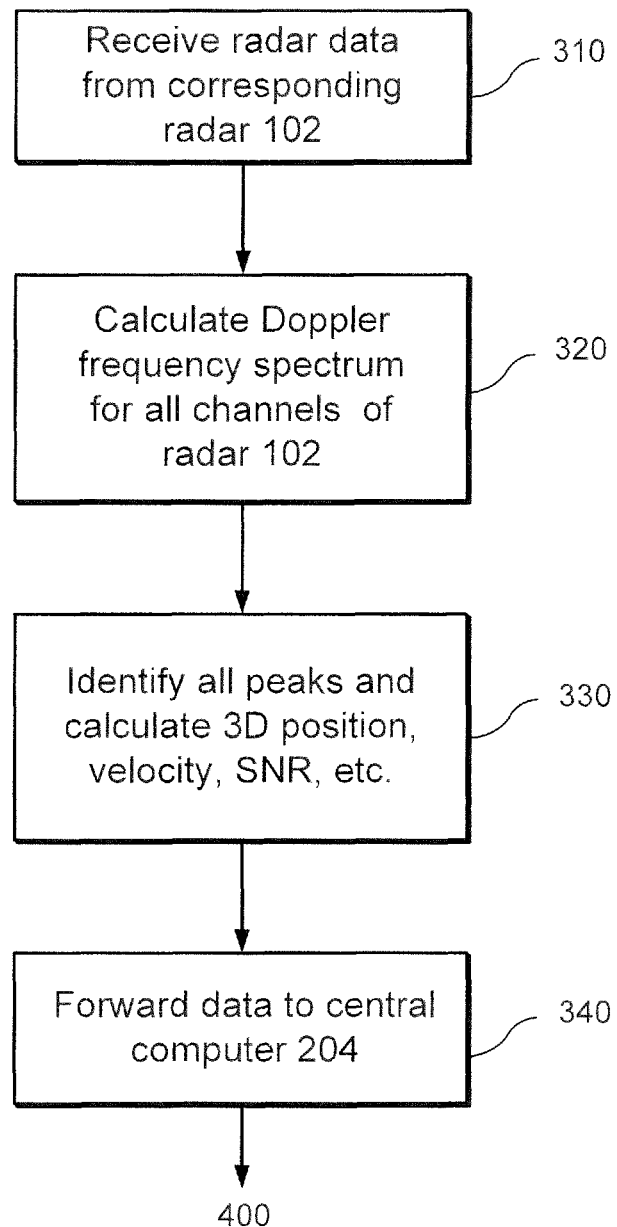
FIG. 3a shows a flow chart of a method of operation of a radar specific computer according to an exemplary embodiment.

The flow chart of FIG. 3*a* shows a method 300 of operation implemented by the computers 202, 202', 202" which method is repeated at each time interval for which measurements are taken. For example, in an exemplary system, each computer 202, 202', 202" may perform the method of FIG. 3*a* every 10 ms (or 100 times per second). Although the method will be described only in regard to the computer 202 and the radar device 102, those skilled in the art will understand that the same steps will be performed by the computers 202', 202" in regard to data from the radar devices 102' and 102".

Figure 3B:
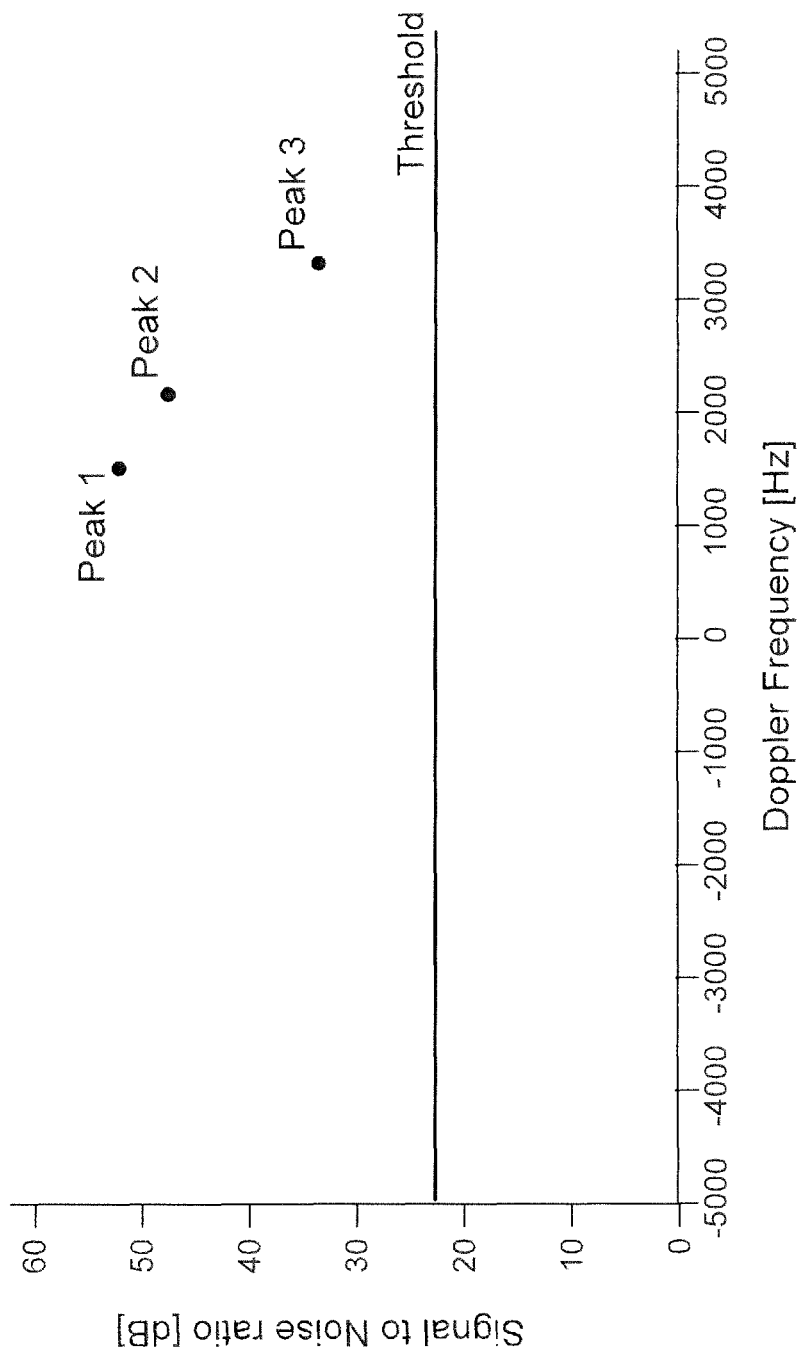
FIG. 3b shows a graph displaying a sample Doppler frequency spectrum.

For each time interval, in step 310 the computer 202 receives data from the radar device 102 and, in step 320, calculates the Doppler frequency spectrum (see FIG. 3*b*), for example, by using a fast fourier transform for all of the channels of the radar device 102 in a known manner. In step 330, the computer 202 uses known techniques to identify local intensity maxima from the Doppler frequency spectrum creating peaks representing objects moving through the field of view 110 of the radar device 102. As would be understood by those skilled in the art, for each Doppler frequency peak, 3D position and other data (velocity, signal to noise ratio, etc.) for an object represented in the radar data are calculated for the identified peak. In the following, a peak is considered including corresponding 3D position, velocity, signal to noise ratio and other characteristics for the given object at that point in time. In step 340 the computer 202 forwards to the central computer 204 data corresponding to the identified peaks represented in the coordinate system of the radar device 102. As would be understood by those skilled in the art, in an alternate embodiment, the computer may translate the data corresponding to the identified peaks into the universal coordinate system before forwarding this data to the central computer 204.

Figure 4:
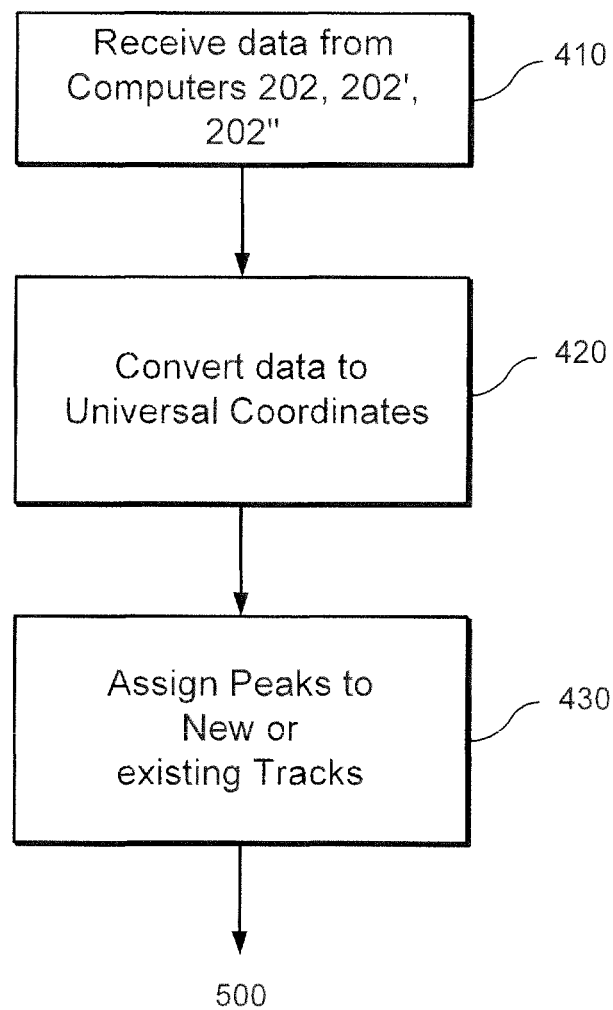
FIG. 4 shows a flow chart of a method for tracking multiple objects according to an exemplary embodiment.

For each time interval, the central computer 204 receives the data generated by the computers 202, 202', 202" in step 340 and performs the method 400 of FIG. 4 to track all of the projectiles within the fields of view 110, 112, 118 determined to be relevant (e.g., for a driving range, all projectiles determined to be golf balls in flight). For example, as would be understood by those skilled in the art, moving items which do not follow the patterns associated with ballistic flight (example, birds) can be detected and eliminated from the analysis. In step 410, the central computer 204 receives data from each of the computers 202, 202', 202" for the current time interval and, in step 420, converts this data to the universal coordinate system. In step 430, the central computer 204 determines whether each peak represented in the data can be assigned to an existing trajectory or whether a new trajectory should be initiated. This process is more clearly illustrated by the method 500.

Figure 5:
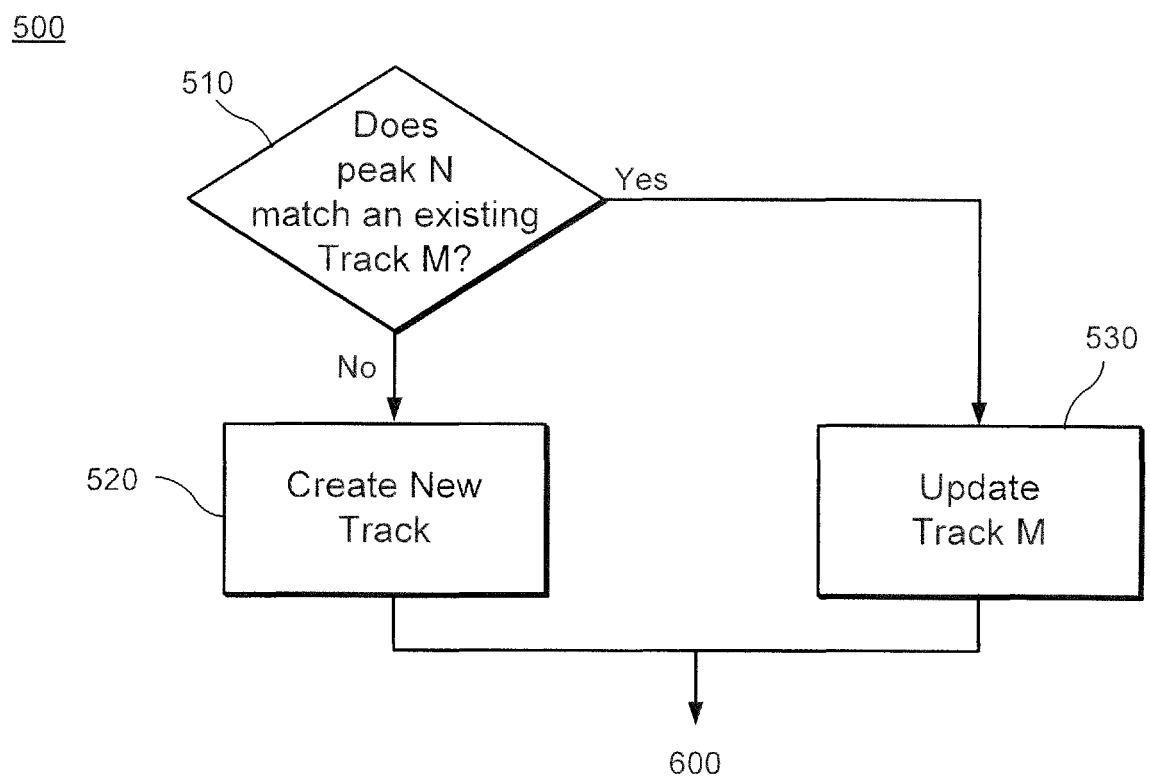
FIG. 5 shows a flow chart of a method for determining whether to place a peak in a new or existing Track.

As shown in FIG. 5, for each time interval the central computer 204 analyzes each of the peaks received from all of the radars 102, 102', 102" to determine if the peak N matches an existing track M. As would be understood by those skilled in the art, a track is a time sequence of 3-dimensional positions and other trajectory data associated with a moving object. In step 510 the central computer 204 compares the peak N to each existing track to determine whether the peak N matches any of the existing tracks. Those skilled in the art will understand that the central computer may determine whether a peak represents a new point on an existing trajectory by comparing the new position and velocity data to data from existing tracks (e.g., by comparing data from the peak to that for each track from one or more prior time intervals) to determine whether the new data is consistent with prior velocity and position data for any of the tracks. That is, if the central computer 204 determines that a distance between a prior ball position and the new peak is equal to (within a certain tolerance) a distance that which would have been traversed by the ball of an existing track M at its prior velocity and this distance is consistent with a direction of the prior velocity, this peak will be assigned to this prior trajectory M. If the peak N matches an existing track M, the method proceeds to 600. If the new peak N is not consistent with any existing trajectory, it will be assigned as the initial point for a new trajectory and the method proceeds to 600.

Figure 6:
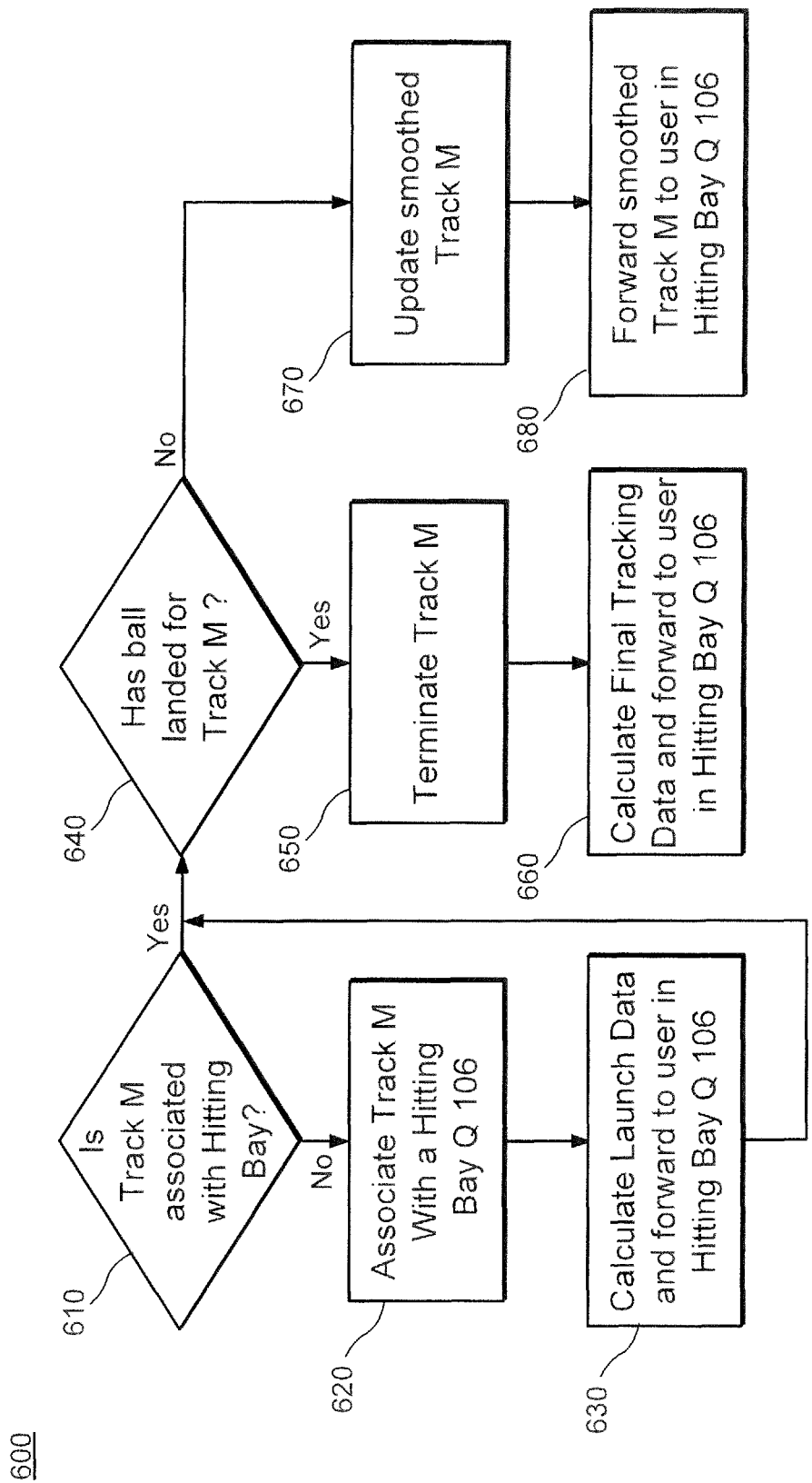
FIG. 6 shows a flow chart of a method for assigning a hitting bay to a Track and for determining when a track is complete.

In method 600 as shown in FIG. 6, for each Track M the central computer 204 determines whether the track is associated with a specific one of the hitting bays 106. In step 610, if the Track M is not associated with a hitting bay 106, the central computer 204 associates the Track M with a hitting bay 106 in step 620 by, for example, moving back in time along the Track M to an initial point at one of the hitting bays 106. Alternatively, if an initial point of the Track M is not at one of the hitting bays 106 (e.g., the ball was not picked up until it had travelled a distance from its launch), the specific hitting bay 106 may be identified by extrapolating back in time (e.g., continuing the Track M back in time along a path consistent with its later trajectory) until the Track M reaches one of the hitting bays 106. The central computer 204 then, in step 630, calculates launch data for the ball associated with Track M and forwards the data to the hitting bay Q 106 associated with this Track M. The method then proceeds to step 640. As would be understood by those skilled in the art, the data forwarded to the hitting bay 106 (or other location) associated with the launch location of a Track M may include graphic data illustrating a flight path of the ball from one or more perspectives, tabular data concerning variables such as launch speed, average speed, launch angle relative to the horizontal, spin rate, spin axis, distance covered, maximum height, etc. In addition, this data may be provided to a device associated with the hitting bay Q 106 (or any other location) associated with the launch location. For example, this device may be a screen displaying the data, a mobile device associated with a user located at the launch location, etc.

If, in step 610, the Track M is associated with a specific hitting bay Q 106, the method proceeds to step 640. In step 640 the central computer 204 determines whether the ball has landed. For example, if the Track M has proceeded upward along an arc, peaked and then continued to descend along an arc and in the current time interval the height of the ball is the same or higher in the previous time interval, the central computer 204 determines that the ball has landed. Alternatively, the computer 204 may make this determination based on a comparison between an elevation of the ball and a known elevation of the surface at the current location of the ball. If the central computer 204 determines in step 640 that the ball has landed, the Track M is terminated in step 650 and final data is calculated in step 660 and forwarded to the user in the identified hitting bay Q 106. If, in step 640 the central computer 204 determines that the ball has not yet landed, in step 670 the Track M is smoothed (e.g., filtered to reduce noise) and in step 680 the updated smoothed Track M is provided to the user in the hitting bay Q 106 associated with the Track M. Those skilled in the art will understand that this information may also be forwarded to any number of hitting bays 106 as desired. For example, if multiple hitting bays 106 are involved in a competition, all of the Tracks associated with these hitting bays 106 may be provided to all of these hitting bays 106. For Tracks M that have not been terminated, the process repeats for the next time interval.

FIGS. 7 and 8a-8c show a method for dealing with situations where two or more balls are close enough together in time and Doppler frequency that one or more of the tracks is obscured by another of the tracks. Specifically, as seen in FIG. 7, in this example, Track T1 for a ball 1 crosses a Track T2 for ball 2 and the Track for T1 interrupts the Track T2 for a period of time represented by the gray area 710 in each of FIGS. 7 and 8a-8C. The Tracks T1 and T2 overlap in the perspective of FIG. 7 for the time range 710 so that, when the two tracks diverge after this overlap 710, the computer dedicated to the radar generating the data may not be able to determine immediately which of the later Track portions a and b is associated with T1 and which is associated with T2. However, when the data included in the Tracks T1 and T2 is broken down to show the paths of the balls 1 and 2 over time as shown in FIGS. 8a-8c, it becomes clear that the portion a is a continuation of Track T1 while the portion b is a continuation of the Track T2. That is a comparison of the travel represented by the portions a and b with the initial portions of the Tracks T1 and T2 makes clear to which track the portions a and b should be assigned. As would be understood by those skilled in the art, the system may also compare other parameters such as, for example, the velocity represented by the initial portions of the Tracks T1 and T2 with the velocity represented in portions a and b to enhance the accuracy of the selection.

Figure 9:
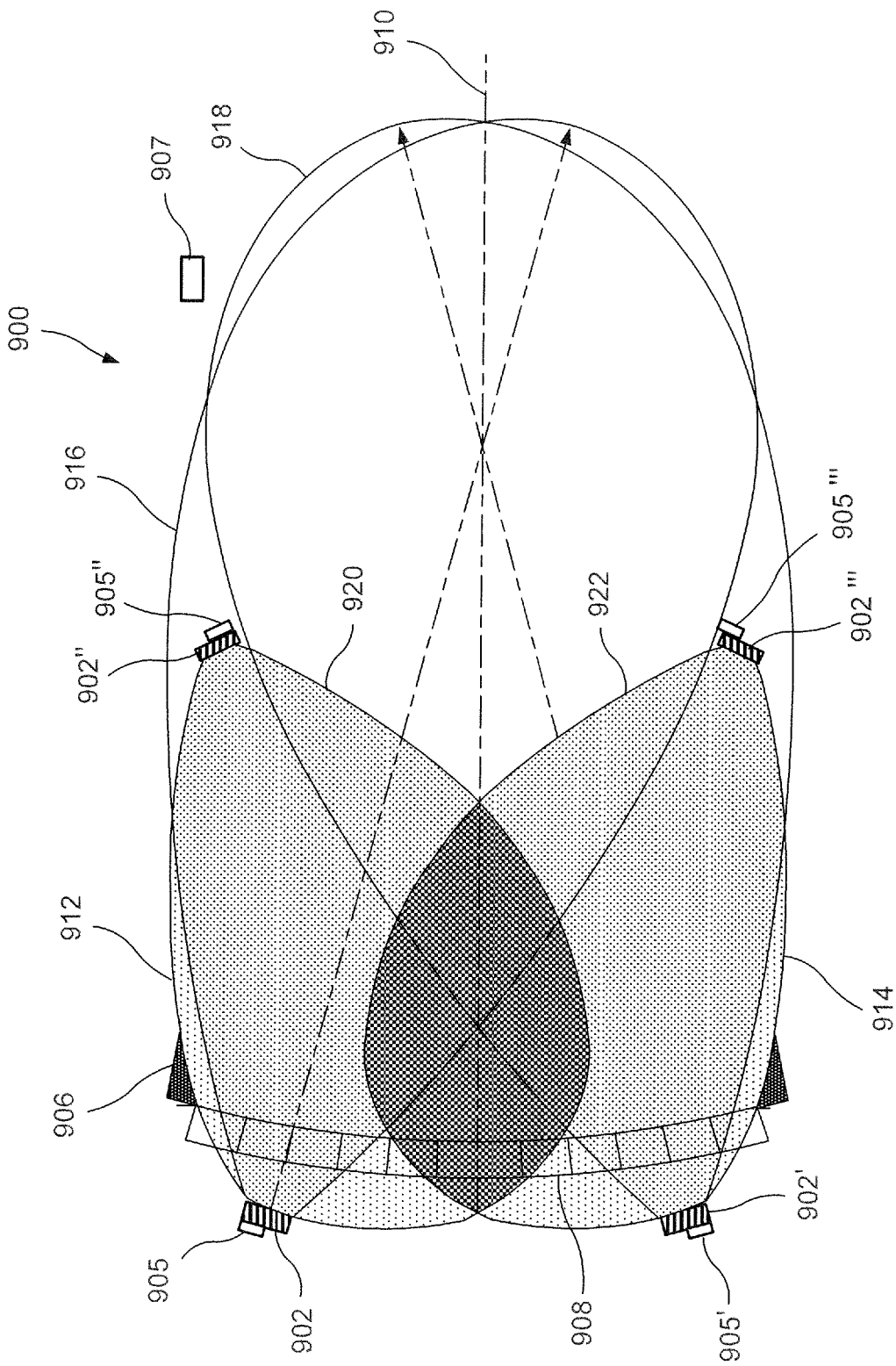
FIG. 9 shows a perspective view of a system according to an embodiment of the invention including a system employing four radar devices.
Figure 10:
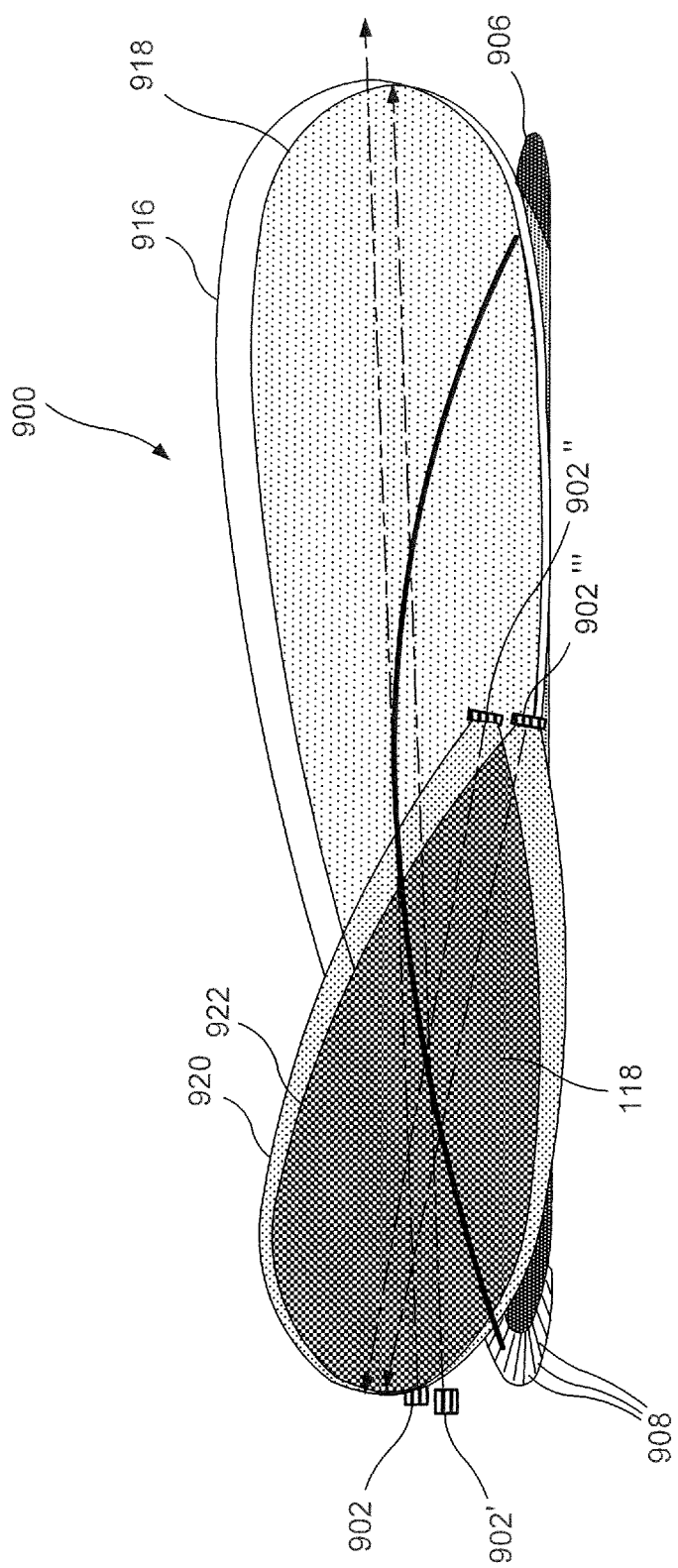
FIG. 10 shows a side view of the system of FIG. 9.

FIGS. 9 and 10 show a system 900 for tracking a plurality of objects according to a further exemplary embodiment.

The system 900 includes four radar devices 902, 902', 902", 902'". Similar to the system 100, each of the radar devices 902, 902', 902", 902'" is coupled to a corresponding computer 905, 905', 905", 905'", respectively, and each of these radar computers is connected to a central computer 907 in the same manner as described above in regard to system 100. The radar devices 902" and 902'" are positioned in the same manner as the radar devices 102' and 102" of the system 100 while the radar device 102 has been replaced in system 900 with the two radar devices 902, 902'. Each of the radars is located behind the hitting bays 908 of the driving range 906 and positioned similarly to the radar 102 except that, instead of being located on a centerline 910 of the driving range 906, the radar device 902 is offset from the centerline 910 toward a right edge 912 of the driving range 906 while the radar device 902' is offset from the centerline 910 toward a left edge 914. Thus the fields of view 916, 918, 920, 922 of radar devices 902, 902', 902", 902'", respectively, overlap in a manner similar to the fields of view 110, 112, 118 of the radar devices 102, 102', 102", respectively, of system 100. The central computer 907 of the system 900 coordinates with the computers 905, 905', 905", 905'" in the same manner as the central computer 204 communicates with the computers 202, 202', 202" to track projectiles moving between the various fields of view. The four radar device arrangement of system 900 provides a more complete coverage of the area of the driving range 906 and the hitting bays 908 than in system 100 but otherwise operates similarly.

Figure 11:
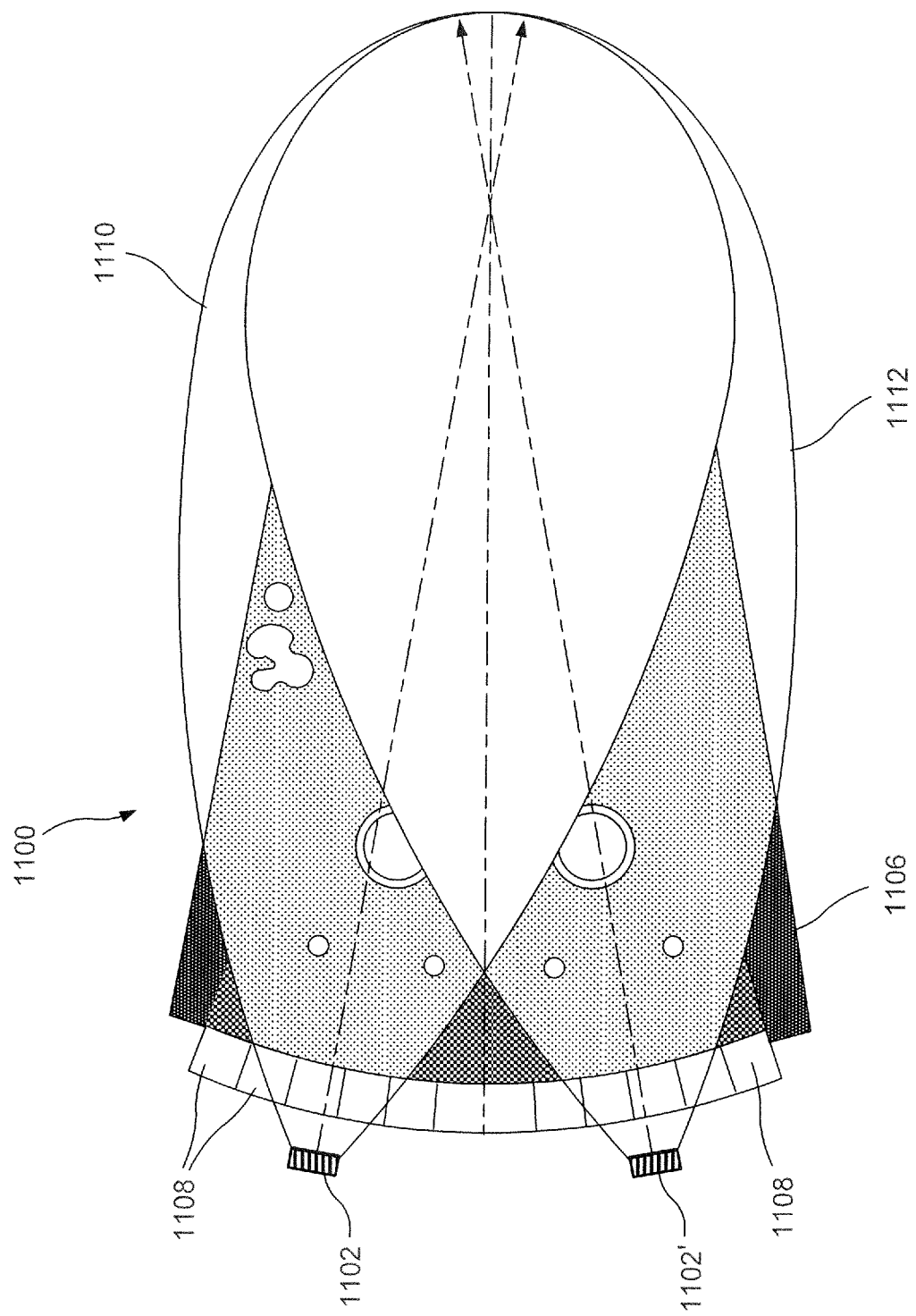
FIG. 11 shows a perspective view of a system according to an embodiment of the invention including a system employing two radar devices.
Figure 12:
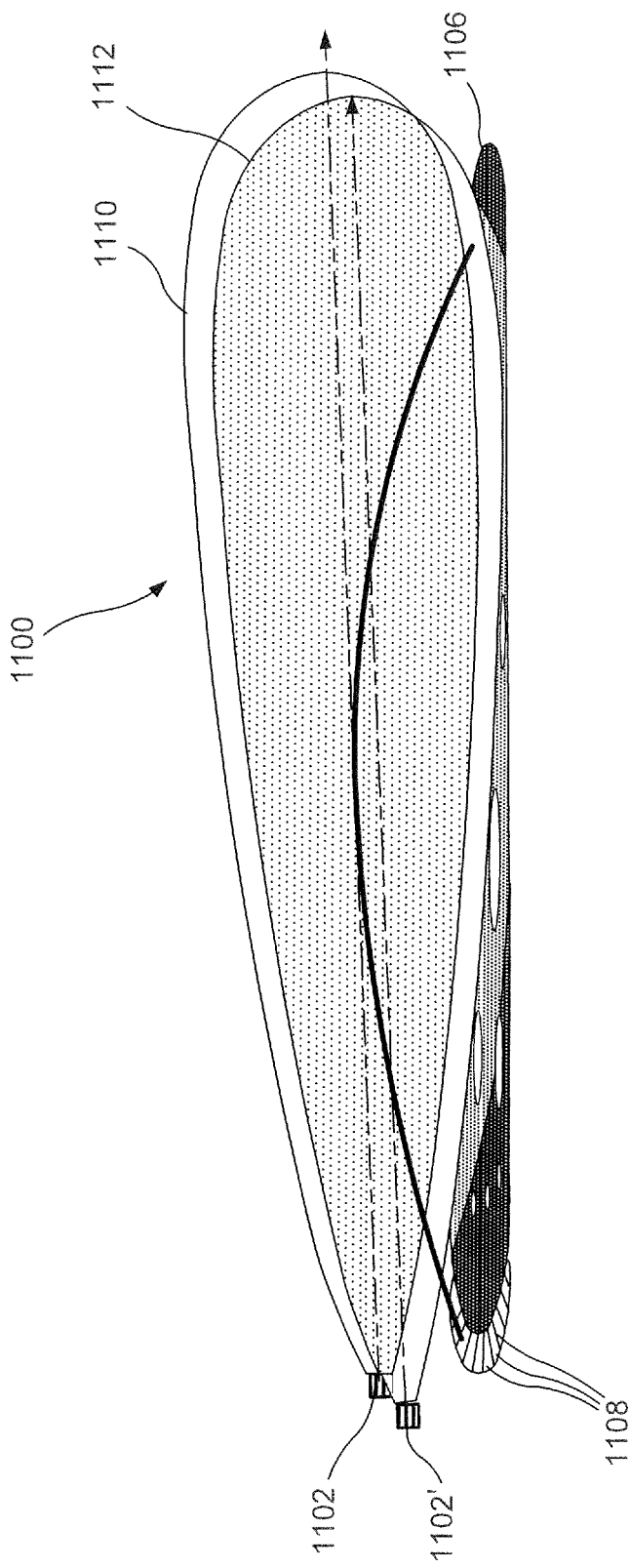
FIG. 12 shows a side view of the system of FIG. 1.

FIGS. 11 and 12 show a system 1100 for tracking a plurality of objects according to a further exemplary embodiment. The system 1100 includes two radar devices 1102, 1102'. The system 1100 is similar to the system 900 with the radar devices 1102 and 1102' positioned substantially similarly to the radar devices 902, 902' behind the hitting bays 1108 of the driving range 1106. In the system 1100, however, there are no additional radar devices positioned in front of the hitting bays 1108 as were the radar devices 902", 902'". Those skilled in the art will understand that the system 1100 may include a similar arrangement of radar computers coupled to an optional central computer operating in a manner similar to the computers of the system 100. As can be seen in FIGS. 11 and 12, the fields of view 1110, 1112 of the radar devices 1102, 1102', respectively, overlap while leaving certain portions of the driving range 1106 uncovered. As will be described below in regard to the system 1300, portions of trajectories passing through these uncovered portions of the driving range 1106 will be extrapolated by the system 1100 based on the portions of the trajectories detected by the radar devices 1102, 1102' to identify a specific hitting bay 1108 from which each ball was launched and to complete the trajectory for each ball to its landing point. The system 1100 is well suited for golf driving ranges with only a single elevation level of hitting locations. In this case ball trajectories will quickly be inside field of view 1110 and/or 1120 without line of sight being obstructed by a building as may be the case in a multi-floor hitting facility. Obviously the system 1100 might consist of one, two or more radars 1102 depending on the need for covering a specific width of launch area and how far behind the hitting location 108 the radar devices 1102 and 1102' can be placed.

Figure 13:
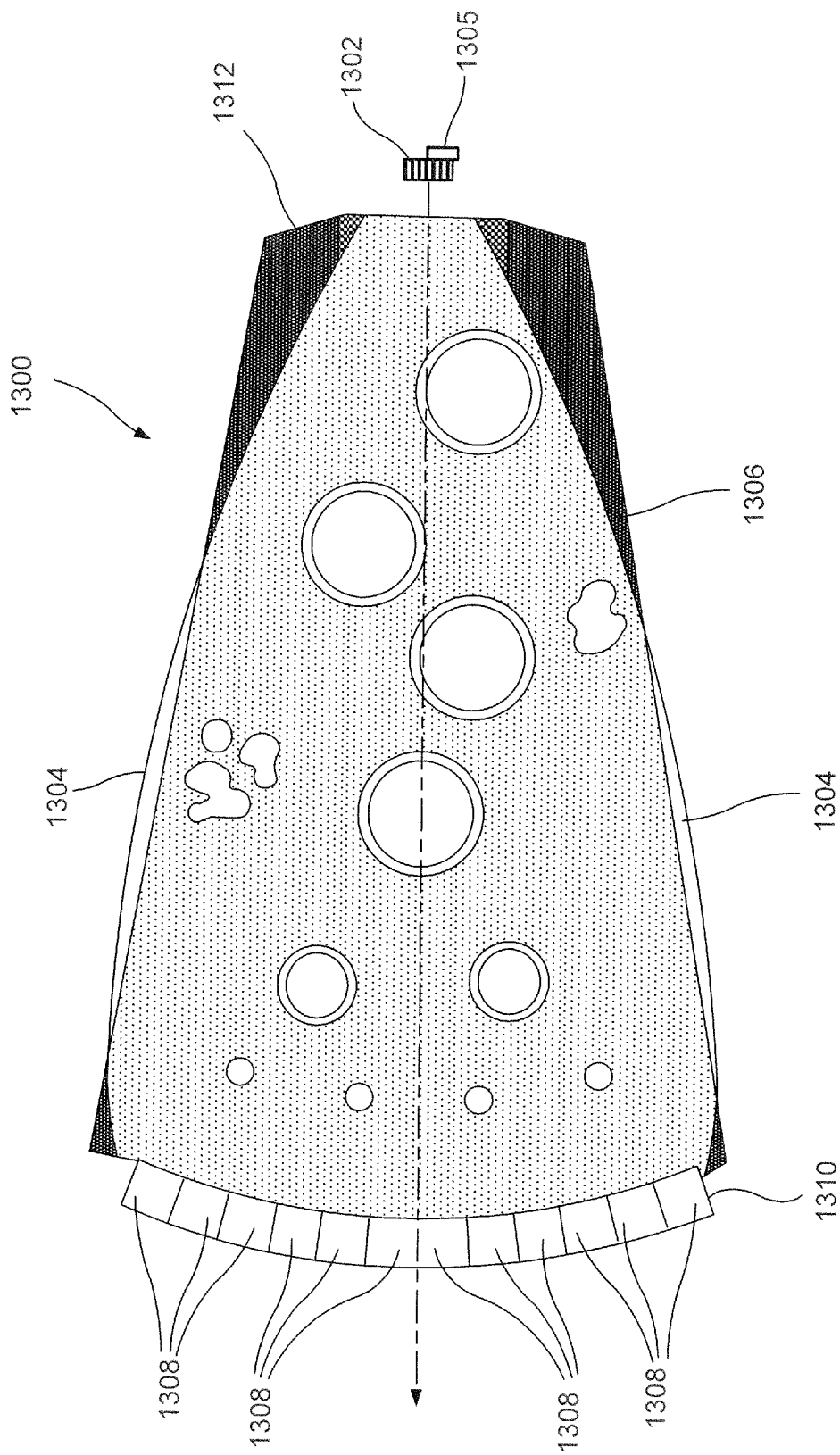
FIG. 13 shows a perspective view of a system according to an embodiment of the invention including a system employing a single radar device.
Figure 14:
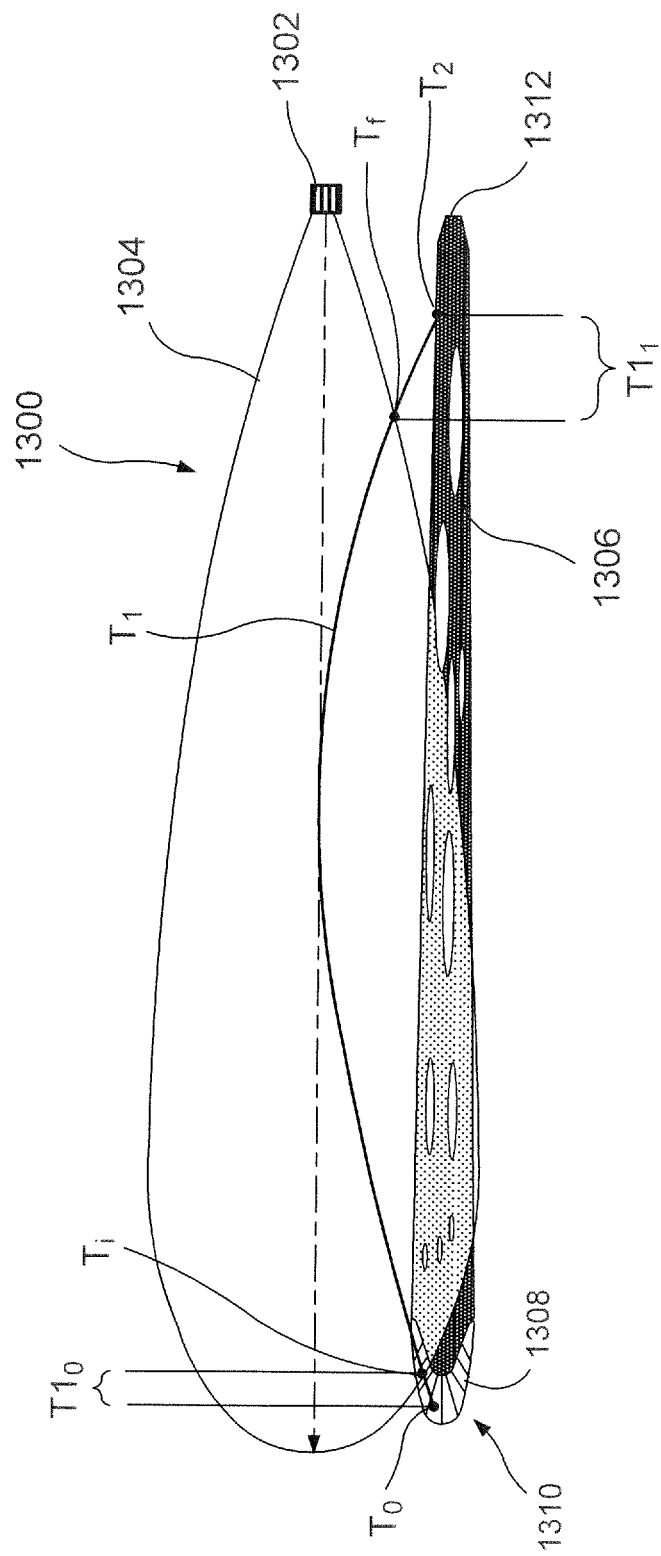
FIG. 14 shows a side view of the system of FIG. 13.

As seen in FIGS. 13 and 14, a system 1300 for tracking a plurality of objects according to a further exemplary embodiment. The system 1300 includes a single radar device 1302 positioned so that a field of view 1304 of the radar device 1302 includes substantially all of a target area into which projectiles are to be launched. In the embodiment of FIGS. 13 and 14, the system 1300 is a system for tracking golf balls hit into the target area (driving range 1306) from a plurality of launch areas (hitting bays 1308) distributed along a first end 1310 of the driving range 1306. The field of view 1304 of this embodiment includes all of the hitting bays 1308. For example, as seen in FIGS. 13 and 14, the radar 1302 is placed substantially centered on an end line 1312 of the driving range 1306 elevated by a desired distance. This type of setup is desirable if sufficient signal-to-noise ratio and positional accuracy can be achieved on the projectile trajectories close to the hitting bays 1308, so that the system can still accurately associate each trajectory with a hitting bay in the launch area. If this was a golf driving range, this would typically require that the radar 1302 should be positioned approximately 60-250 m in front of the hitting bays 1308. This type of setup would be very suitable for a golf driving range with limited flight distance of the golf ball, e.g. because the golf ball is stopped by a net.

The radar unit 1302 for this embodiment may, for example, be a higher powered Doppler radar emitting microwaves at X-band and with high enough positional measurement accuracy to ensure accurate association of projectile trajectories with hitting bays. Thus, the system 1300 operates substantially similarly to the system 100 except that each ball will be tracked based solely on data from the radar device 1302 and there is no need for more than one coordinate system or for any hand-off of tracking from one radar device to another as there was with the system 100. For portions of any ball's flight that are outside of the field of view 1304, the computer 1305 can extrapolate forward or backward in time to estimate the entire trajectory of the ball from launch (e.g., identify a hitting bay 1308 from which it was launched) to landing. Those skilled in the art will understand that the system 1300 may still employ a universal coordinate system based on identifiable physical landmarks in the driving range 1306 in the same manner as described above for the system 100. In this scenario, the coordinate system for the radar device 1302 may originally be set to coincide perfectly with the universal coordinate system. However, if the device 1302 is moved at any time, the system 1300 movement may be measured and any changes in position or aiming may be accounted for with the system 1300 translating the new radar specific coordinate system (for the device 1302) into the universal coordinate system in order to accurately relate measurements from the device 1302 to positions on the driving range 1306.

As shown in FIG. 14, an exemplary Track T1 of a golf ball leaves a hitting bay 1308 that is outside the field of view 1304 at time T0 and enters the field of view 1304 soon after launch at time Ti. The radar device 1302 picks up the ball when it enters the field of view 1304 and tracks the ball until the ball leaves the field of view 1304 at time Tf. The computer 1305 generates a trajectory for ball based on data from the radar device 1302 covering the entire time from Ti to Tf and, based on this trajectory, extrapolates an initial portion of the trajectory $T1_0$ extending from T0 to T1 to identify the hitting bay 1308 from which the ball was launched. The computer 1305 then extrapolates the portion $T1_1$ of the trajectory T1 extending from time Tf to time Tl at which the ball lands. The computer 1305 then assembles the entire trajectory T1 and sends the data corresponding to this trajectory T1 to the hitting bay 108 identified as the launch location for the ball. Those skilled in the art will understand that this same extrapolation process may be used in any of the described systems to account for any time during which a ball either leaves the fields of view of the radar(s) or for any time period during which the system loses track of the ball for any reason.

Those skilled in the art will understand that, although the previously described embodiments describe discrete hitting bays 106, the system 100 (or any of the other systems disclosed herein) may identify the hitting locations associated with each of the detected projectile tracks. These hitting locations may then be associated with a user of the system associated with each projectile. In the case of a golf driving range, the users may be permitted to hit from any location within a large launch area. Each user may then be associated with a particular location from which balls are being hit by logging into the system (e.g., over wifi or another wireless network) using an electronic device with location capability. For example, a user may log on to the system using a mobile phone having GPS or any other electronic location system and the system may associate with this device all shots hit from any location that is closer to the current location of this device than to any other logged in device. Alternatively, or in addition, the system may query a device to which it is considering associating one or more shots and ask the user of the device to indicate whether or not he actually took any or all of the indicated shots (Tracks). Based on the user response, the system may then associate future tracks from a given location with this user (user device). Those skilled in the art will understand that this variation may be used with any or all of the previously described systems.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Linux platform, a Mac platform and MAC OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A system for tracking multiple projectiles, comprising:
a first radar device aimed so that a first field of view of the first radar device covers at least a portion of a target volume into which projectiles are to be launched, wherein a predetermined launch location is located adjacent to the target volume, the predetermined launch location having a plurality of individual launch areas; and
a processor receiving data from the first radar and identifying from the data from the first radar a track for each of a plurality of projectiles, the processor projecting each track back in time to identify a launch location associated with the corresponding projectile and identify which one of the individual launch areas is the launch area from which the corresponding projectile was launched.

2. The system of claim 1, wherein the predetermined launch location is subdivided into the plurality of individual launch areas, each individual launch area having a pre-installed device associated with the launch area.

3. The system of claim 2, wherein a first portion of the individual launch areas are elevated above a second portion of the individual launch areas.

4. The system of claim 3, wherein the individual launch areas are hitting bays at a driving range and the projectiles are golf balls.

5. The system of claim 4, wherein each of the pre-installed devices has a screen configured to display golf ball trajectories and flight data associated with the trajectories.

6. The system of claim 5, wherein the processor provides trajectory data to a given pre-installed device at a given hitting bay, the trajectory data corresponding to a trajectory of a golf ball launched from the given hitting bay.

7. The system of claim 1, wherein the processor associates a user with a user location when the user registers with the system and enables a GPS functionality on a user device.

8. The system of claim 7, wherein, when each of a plurality of users is associated with a corresponding user device, the processor associates a first track with a first one of the user devices when a launch location of the first track is closer to a location of the first user device than to a location of any of the other user devices.

9. The system of claim 8, wherein the processor queries each user device to ask the user to indicate whether the user launched any of a group of recently launched projectiles.

10. A method for tracking multiple projectiles, comprising:
receiving data from a first radar device aimed so that a first field of view of the first radar device covers at least a portion of a target volume into which projectiles are to be launched, wherein a predetermined launch location is located adjacent to the target volume, the predetermined launch location having a plurality of individual launch areas;
identifying from the data from the first radar a track for each of a plurality of projectiles; and
projecting each track back in time to identify a launch location associated with the corresponding projectile and identify which one of the individual launch areas is the launch area from which the corresponding projectile was launched.

11. The method of claim 10, wherein the predetermined launch area is subdivided into the plurality of individual launch areas, each individual launch area having a pre-installed device associated with the launch area.

12. The method of claim 11, wherein a first portion of the individual launch areas are elevated above a second portion of the individual launch areas.

13. The method of claim 12, wherein the individual launch areas are hitting bays at a driving range and the projectiles are golf balls.

14. The method of claim 13, wherein each of the pre-installed devices has a screen configured to display golf ball trajectories and flight data associated with the trajectories.

15. The method of claim 14, further comprising:
providing trajectory data to a given pre-installed device at a given hitting bay, the trajectory data corresponding to a trajectory of a golf ball launched from the given hitting bay.

16. The method of claim 10, further comprising:
associating a user with a user location when the user registers with the system and enables a GPS functionality on a user device.

17. The method of claim 16, further comprising:
when each of a plurality of users is associated with a corresponding user device, associating a first track with a first one of the user devices when a launch location of the first track is closer to a location of the first user device than to a location of any of the other user devices.

18. The method of claim 16, further comprising:
querying each user device to ask the user to indicate whether any of a group of recently launched projectiles were launched by the user.

\* \* \* \* \*